(12) United States Patent
Xiu

(10) Patent No.: US 9,877,061 B2
(45) Date of Patent: Jan. 23, 2018

(54) FRONT END MULTIPLEXER TOPOLOGY FOR A SET TOP BOX

(71) Applicant: THOMSON LICENSING, Issy de Moulineaux (FR)

(72) Inventor: Lincheng Xiu, Zionsville, IN (US)

(73) Assignee: THOMSON Licensing, Issy-les-Moulineaux (FR)

( * ) Notice: Subject to any disclaimer, the term of this patent is extended or adjusted under 35 U.S.C. 154(b) by 41 days.

(21) Appl. No.: 15/105,425

(22) PCT Filed: Dec. 18, 2013

(86) PCT No.: PCT/US2013/075915
§ 371 (c)(1),
(2) Date: Jun. 16, 2016

(87) PCT Pub. No.: WO2015/094203
PCT Pub. Date: Jun. 25, 2015

(65) Prior Publication Data
US 2017/0026685 A1    Jan. 26, 2017

(51) Int. Cl.
*H03H 7/46* (2006.01)
*H04N 21/426* (2011.01)
(Continued)

(52) U.S. Cl.
CPC ..... *H04N 21/42615* (2013.01); *H04B 1/0057* (2013.01); *H04L 12/2838* (2013.01)

(58) Field of Classification Search
CPC ........ H03H 7/46; H03H 7/763; H03H 7/0115; H03H 9/0576; H04B 1/50; H04B 1/0057; H04N 21/42615; H04L 12/2838
(Continued)

(56) References Cited

FOREIGN PATENT DOCUMENTS

| EP | 2306679 A1 | 4/2011 |
| EP | 2525572 A1 | 11/2012 |
| WO | WO2010087913 A2 | 8/2010 |

OTHER PUBLICATIONS

International Search Report dated: Jun. 6, 2014.

*Primary Examiner* — Robert J Pascal
*Assistant Examiner* — Kimberly Glenn
(74) *Attorney, Agent, or Firm* — Jerome G. Schaefer; Kuniyuki Akiyama

(57) ABSTRACT

An apparatus and method for processing satellite signals is provided. A switch receives an input signal having a predetermined frequency range, the predetermined frequency range including at least two frequency sub-bands. A first diplexer is connected to a first output of the switch and generates a first filtered signal including a first frequency sub-band and a second frequency sub-band and a second filtered signal including a third frequency sub-band. A second diplexer is connected to a second output of the switch and generates a third filtered signal including the first frequency sub-band and a fourth filtered signal including the second frequency sub-band. A controller activates the switch to operate between a first mode and a second mode. In the first mode, the switch provides the input signal to the first diplexer to generate the first and second filtered signals, the first diplexer provides the first filtered signal to the second diplexer to generate the third and fourth filtered signals from the first filtered signal, the second filtered signal being provided to the controller to derive a first type of data therefrom and the third and fourth filtered signals being provided to the controller to derive a second different type of data therefrom. In the second mode, the switch provides the input signal to the second diplexer to generate the third and fourth filtered signals from the input signal, the second diplexer provides the third and fourth input signal to the (Continued)

controller to derive the second different type of data therefrom.

18 Claims, 11 Drawing Sheets

(51) Int. Cl.
*H04B 1/00* (2006.01)
*H04L 12/28* (2006.01)
(58) Field of Classification Search
USPC .......................................................... 333/132
See application file for complete search history.

_US 9,877,061 B2_

FRONT END MULTIPLEXER TOPOLOGY FOR A SET TOP BOX

FIELD OF THE INVENTION

This application claims the benefit, under 35 U.S.C. § 365 of International Application PCT/US2013/075915, filed Dec. 18, 2013, which was published in accordance with PCT Article 21(2) on Jun. 25, 2015 in English, which is incorporated by reference herein in its entirety.

BACKGROUND OF THE INVENTION

Set-top boxes (STB) that receive signals from satellite providers are well known in the art. These STBs are required to process two different types of signals. A first type of signal includes a frequency band that includes only satellite television data (e.g. legacy signal). A second type of signal has a portion of the satellite signal band reserved for networking data and the satellite signal is converted to single wire-multiswitch (SWM) signal. Typically, the band reserved for networking data is structured according to the Multimedia over Coax Alliance (MoCA) standards. Data in the MoCA band typically includes internet data that is transmitted from and received by the STB as well as local area networking data that allows multiple STBs in a particular location to communicate with one another. Thus, STB designers must provide a STB architecture that can receive and process both types of signals. An exemplary STB that can process both Legacy signals and SWM signals is shown in FIG. 1.

FIG. 1 is a block diagram of a conventional STB 1. The STB 1 includes a controller 30 that controls the complete operation of the STB 1. The STB 1 includes an F-connector 4 for receiving an RF input signal 2 from satellite receiver outdoor unit (a LNB or SWM unit, not shown). The manner in which the satellite signal is received and processed to generate the input signal 2 is well known and is not germane to the present invention. The STB 1 also includes a SWM circuit 7 which is a 2.3 MHz FSK transceiver. The SWM circuit 7 sends commands to an outdoor SWM unit in order to move the satellite transponder to a SWM channel. Additionally, the SWM circuit 7 may also receive the status/response of outdoor unit and provide that information to the controller 30. The input signal 2 received via the F-connector 4 is a full spectrum signal and ranges from 22 kHz-2150 MHz for a legacy signal or 2.3 MHz-2150 MHz for a SWM signal. The full spectrum input signal 2 is provided to a first diplexer 6. The first diplexer 6 includes a first high pass filter (HPF) 8 that attenuates the signal to enable a portion of the signal greater than 950 MHz to pass therethrough. The first diplexer 6 also includes a first low pass filter 9 that attenuates the signal such that the portion of the signal below 816 MHz is allowed to pass therethrough. The portion of the signal 2 filtered by the first low pass filter 9 is generally includes digital television data formatted in accordance with the Integrated Services Digital Broadcasting-Terrestrial (ISDB-T) standard. The part of the signal filtered by low pass filter 9 also includes the FM broadcast band, 88-108 MHz which is an undesired signal. A high pass filter 13 having a cutoff frequency of substantially 174 MHz is connected to an output of the first low pass filter 9 and receives the portion of the signal 2 filtered by low pass filter 9. The high pass filter 13 removes FM band, SWM tone or DiSEqC tone. In legacy mode, a 22 kHz DiSEqC signal is used to send commands to outdoor unit, such as LNB, or outdoor antenna switch. In SWM mode, the 2.3 MHz FSK signal is used to communicate with the outdoor SWM module, to assign a SWM channel to a satellite transponder coming from the satellite antenna and this signal is processed by SWM circuit 7 discussed above. The ISDB-T data is provided to an ISDB-T tuner 10 for tuning thereof. The tuned signal is provided to the ISDB-T demodulator 11 for demodulation. The demodulated signal is provided to the controller 30 which may perform further processing as is known in the art and route the demodulated ISDB-T signal to a respective output 34. A single output 34 is shown here for purposes of example only and, as is well known in the art of STB design, the STB 1 may include a plurality of different output connectors for connecting the STB 1 to a display screen or monitor. Outputs may include but are not limited to an HDMI port, a composite video port, component video ports, DVI ports, VGA ports and a Coaxial output port.

The portion of the signal having a frequency greater than 950 MHz is filtered by the first high pass filter 8 and is further provided to the first switch 12. The first switch 12 may be a single pole double through switch that is selectively controllable to define the path taken by the portion of the signal filtered by HPF 8. The controller 30 is preprogrammed upon setup thereof to receive and process either a legacy signal or a SWM signal. If the controller 30 determines that the signal to be processed by the STB 1 is a legacy signal, the first switch 12 is configured to pass the signal filtered by the first HPF 8 to the second switch 22. The second switch 22 provides the filtered satellite signal to a legacy tuner (also called network tuner) 24 for tuning thereof. The filtered satellite signal is spilt by the legacy tuner 24 and one output is provided to a legacy Demod 25 of the controller while the other output is amplified by amplifier 26 and passed through a balun 28 before being received by the A3 tuner and Demod 29 of the controller 30. At least one of the legacy Demod 25 and the A3 tuner and Demod 29 provide the signal to a respective output 34 for display on a display device as is known in the art.

Upon determining by the controller 30 that the signal received at the F-connector 4 is a SWM signal, the first switch 12 is configured to allow the portion of the signal filtered by the first HPF 8 to be provided to a second diplexer 14. The second diplexer 14 includes a second HPF 18 for filtering portions of the signal below substantially 1250 MHz and a second LPF 16 for filtering portions of the signal above substantially 1050 MHz. The output of the second LPF 16 is a signal having a frequency band ranging between substantially 950 MHz and 1050 MHz. The data in this frequency band represents MoCA data and is provided to the MoCA module 21 of the controller 30 via the MoCA transceiver 20. The manner in which the MoCA data is processed is well known and need not be further discussed.

The output of the second HPF 18 of the second diplexer 14 is a signal having a frequency band ranging between substantially 1250 MHz and 2150 MHz which represents the satellite data. The signal output by the second HPF 18 is provided to the second switch 22 and is output to the legacy tuner 24. This signal is processed in a manner similar to that described above and need not be repeated.

Thus, in order to have a STB able to process both legacy and SWM signals, conventional STB 1 includes a dual diplexer architecture such as shown in greater detail in FIG. 2. FIG. 2 is a more detailed view of the dual diplexer architecture described above in FIG. 1. In FIG. 2, the first diplexer 6 is connected at the F-connector 4 to provide a first filtered signal having a frequency substantially below 806 MHZ and a second filtered signal having a frequency band ranging substantially between 950 MHz and 2150 MHz. The first filtered signal includes ISDB-T formatted digital television data while the second filtered signal includes satellite data if the input signal 2 is a legacy signal or includes MoCA and Satellite data if the input signal 2 is a SWM signal. If the signal filtered by the first diplexer 6 is a legacy signal, the entire spectrum of the signal greater than 950 MHz is provided to the tuner as discussed above. In contrast, if the signal filtered by the first diplexer 6 is a SWM signal, the filtered signal is provided to the second diplexer 14 for further filtering to produce an output signal that includes only the frequency band containing MoCA data and a further output signal that includes the frequency band that includes the satellite television data for tuning.

A drawback associated with the convention STB design exhibited in FIGS. 1 and 2 is that the second diplexer 14 which is supposed to generate the MoCA signal and the satellite signal is difficult to design. This is because there is a small transient band. To be optimally effective, the second diplexer 14 needs substantially 50 dB MoCA rejection within the 100-200 MHz frequency band at substantially 1050 MHz. In view of the constraints associated with the rejection requirements as well as those inherent to the switch, it is difficult to obtain an acceptable level of return loss. Return loss is the loss of signal power resulting from the reflection of power on the transmission line. If the STB is unable to route the power applied thereto, it may be reflected back on the F-connector and output to other STBs connected on home network. This may negatively impact the performance of all STBs on the home network. Thus, the conventional STB design including two diplexers results in a sub-optimal level of return loss. Therefore, a need exists to provide a STB that can operate in both legacy and SWM modes while improving the amount of return loss in the system. A system according to invention principles remedies the drawbacks associated with these and other prior art systems.

SUMMARY OF THE INVENTION

In one embodiment, an apparatus for processing satellite signals is provided. A switch receives an input signal having a predetermined frequency range, the predetermined frequency range including at least two frequency sub-bands. A first diplexer is connected to a first output of the switch and generates a first filtered signal including a first frequency sub-band and a second frequency sub-band and a second filtered signal including a third frequency sub-band. A second diplexer is connected to a second output of said switch and generates a third filtered signal including the first frequency sub-band and a fourth filtered signal including the second frequency sub-band. A controller activates the switch to operate between a first mode and a second mode. In the first mode, the switch provides the input signal to the first diplexer to generate the first and second filtered signals, the first diplexer provides the first filtered signal to the second diplexer to generate the third and fourth filtered signals from the first filtered signal, the second filtered signal being provided to the controller to derive a first type of data therefrom and the third and fourth filtered signals being provided to the controller to derive a second different type of data therefrom. In the second mode, the switch provides the input signal to the second diplexer to generate the third and fourth filtered signals from the input signal, the second diplexer provides the third and fourth input signal to the controller to derive the second different type of data therefrom.

In another embodiment, a method of processing satellite signals is provided. The method includes receiving, at a switch, an input signal having a predetermined frequency range, the predetermined frequency range including at least two frequency sub-bands and activating the switch by a controller to operate between a first mode and a second mode. In response to activating the switch to operate in a first mode, connecting a first diplexer to a first output of the switch and providing the input signal to the first diplexer. A first filtered signal is generated and includes a first frequency sub-band and a second frequency sub-band and a second filtered signal is generated and includes a third frequency sub-band. The first filtered signal is provided to a second diplexer which generates a third filtered signal including the first frequency sub-band and a fourth filtered signal including the second frequency sub-band, the third and fourth filtered signals being generated based on the first filtered signal. In response to activating the switch to operate in a second mode, a second output of the switch is connected to the second diplexer and the input signal is provided to the second diplexer. The second diplexer generates the third filtered signal including the first frequency sub-band and a fourth filtered signal including the second frequency sub-band based on the input signal. The second filtered signal from the first diplexer is provided to the controller to derive a first type of data and the third and fourth filtered signals are provided from the second diplexer to the controller to derive a second different type of data.

BRIEF DESCRIPTION OF THE DRAWING FIGURES

DETAILED DESCRIPTION

Figure 1:
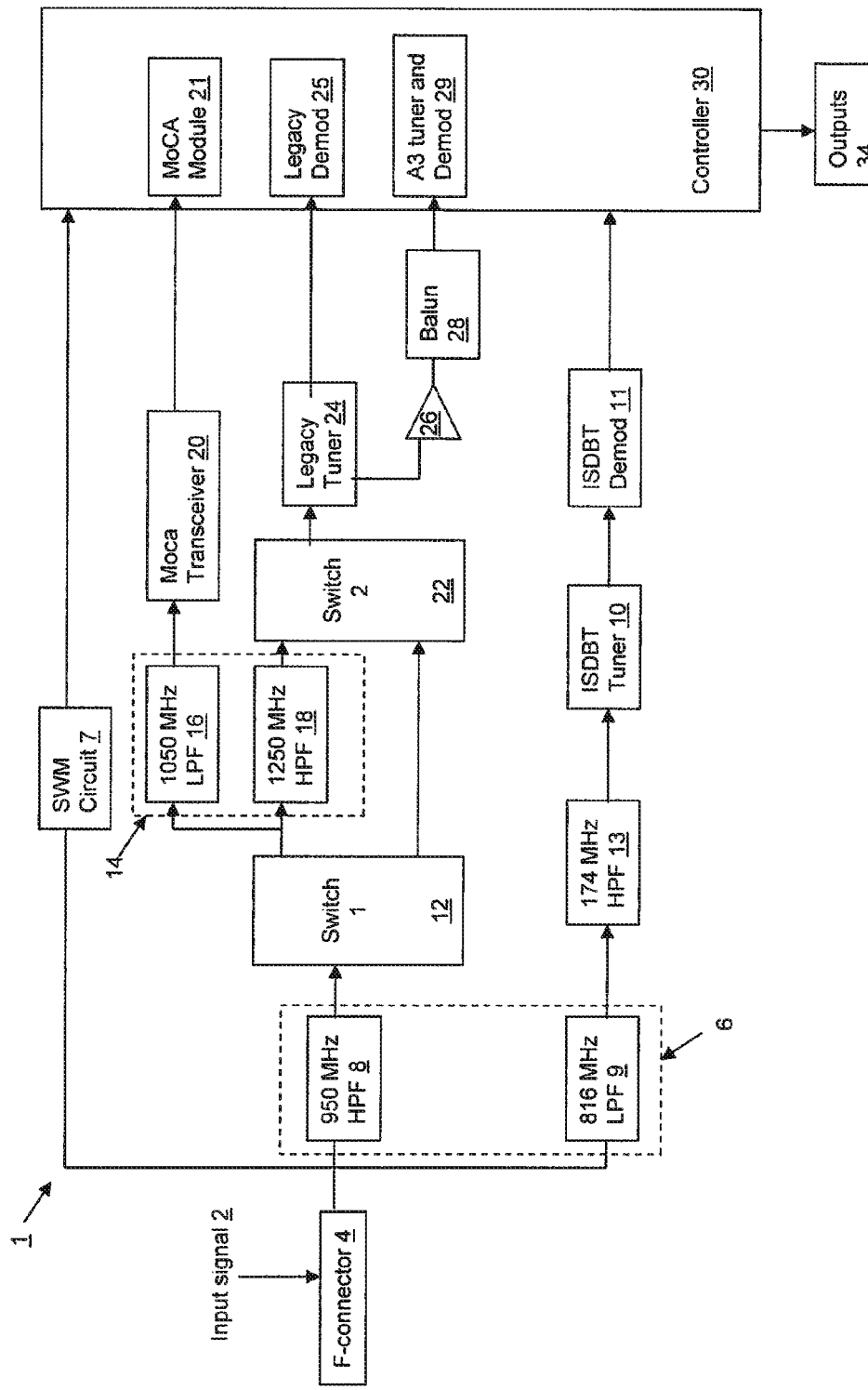
FIG. 1 is a block diagram of prior art set-top box architecture.

It should be understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

If used herein, the term "component" and/or "module" is intended to refer to hardware, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein. The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

The present invention provides a novel front end architecture for a set top box (STB) used in processing input signals received via satellite communication. According to invention principles, the front end advantageously enables the STB to process both legacy satellite signals and SWM satellite signals while improving the return loss on the F-connector of the STB. The front end advantageously enables the STB to split the full spectrum input signal which has a frequency band ranging substantially between 174 MHz and 2150 MHz into several sub-bands including the ISDB-T band, high RF MoCA band and Satellite tuner band. When splitting the full spectrum signal into these sub-bands, the transient band between sub-bands is quite small (on the order of 100 MHz to 200 MHz) and it is critical to implement the rejection requirement for the high frequency sub-bands (e.g. the MoCA sub-band and satellite sub-band) as designed otherwise data within the respective sub-bands may be lost or otherwise compromised. To minimize the issues associated with current filtering techniques used to generate sub-bands from the full spectrum input signal, the apparatus advantageously uses a band-pass/band-stop diplexer. The diplexer advantageously provides a very steep MoCA rejection in conjunction with the conventional satellite high pass filter positioned downstream. This topology simplifies the circuitry of the STB and improves the level of return loss at the F-connector. There are certain difficulties associated with using only LPF/HPF diplexers. Specifically, it is difficult to achieve appropriate rejection of the MoCA frequency band while having an acceptable level of return loss for the MoCA band and Satellite band at the F connector.

Figure 3A:
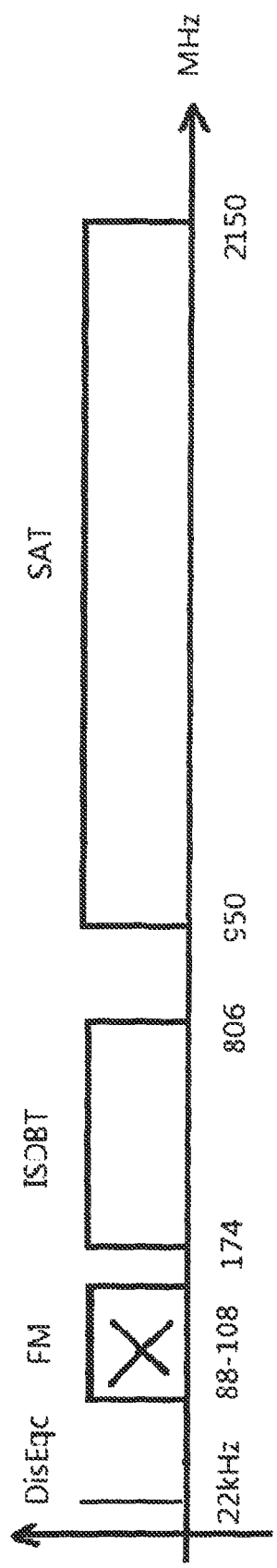
FIG. 3A illustrates the frequency spectrum of a legacy signal received by a STB.
Figure 3B:
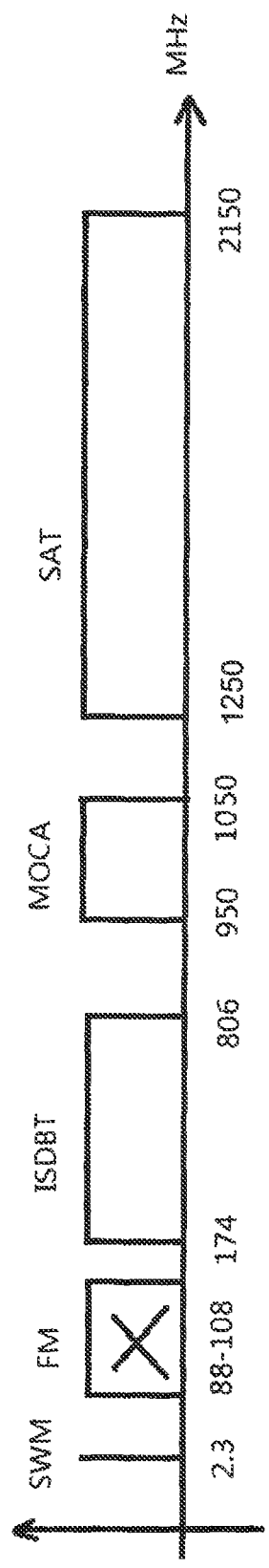
FIG. 3B illustrates the frequency spectrum of a SWM signal received by a STB.

Because satellite STB's need to be able to process legacy satellite signals which do not include MoCA data in SWM mode which have a portion of the spectrum allocated to satellite data reserved for MoCA data, the front end apparatus according to invention principles advantageously provides appropriate filtering techniques based on the type of signal being received at the particular STB. FIGS. 3A and 3B illustrate the spectrums and sub-bands of each of the legacy signals and SWM signals. In FIG. 3A, the full spectrum of a legacy signal is provided. The full spectrum range of data within the legacy signal is between 174 MHz and 2150 MHz. The legacy signal includes two separate sub-bands comprising different types of data. A first sub-band is the ISDBT sub-band. The ISDBT sub-band has frequency range of 174 MHz and 806 MHz and provides digital television data formatted according to the ISDB-T standards. The second sub-band is the Satellite sub-band and is labeled SAT in FIG. 3A. The satellite sub-band includes digital television data, and audio data and has a frequency ranging between 950 MHz and 2150 MHz. The portions of the satellite sub-band occupied by the various types of data are known and need not further be discussed.

FIG. 3B illustrates the full spectrum of an input SWM signal that may be received by a particular STB. The SWM signal in FIG. 3B comprises three (3) sub-bands. The first sub-band is the same as the first sub-band in FIG. 3A and represents the ISDBT formatted digital television data. The frequency band of the first sub-band ranges between 174 MHz and 806 MHz. The second sub-band is the MoCA band that includes MoCA-related data. The frequency range associated with the second (MoCA) sub-band is between 950 MHz and 1050 MHz. The third sub-band in the SWM signal represents the satellite data sub-band and ranges between 1250 MHz and 2150 MHz. The data in the third sub-band may include the same type of data contained in the second sub-band of the legacy signal.

The FM broadcast band, 88-108 MHz is an undesired signal, a high pass filter cascaded with the ISDB-T low pass filter is applied to remove FM band, SWM tone or DisEqC tone. In legacy mode, a 22 kHz DisEqC signal is used to send commands to outdoor unit, such as LNB, or outdoor antenna switch. In SWM mode, the 2.3 MHz FSK signal is used to communicate with the outdoor SWM module, to assign a SWM channel to a satellite transponder coming from the satellite antenna.

Figure 2:
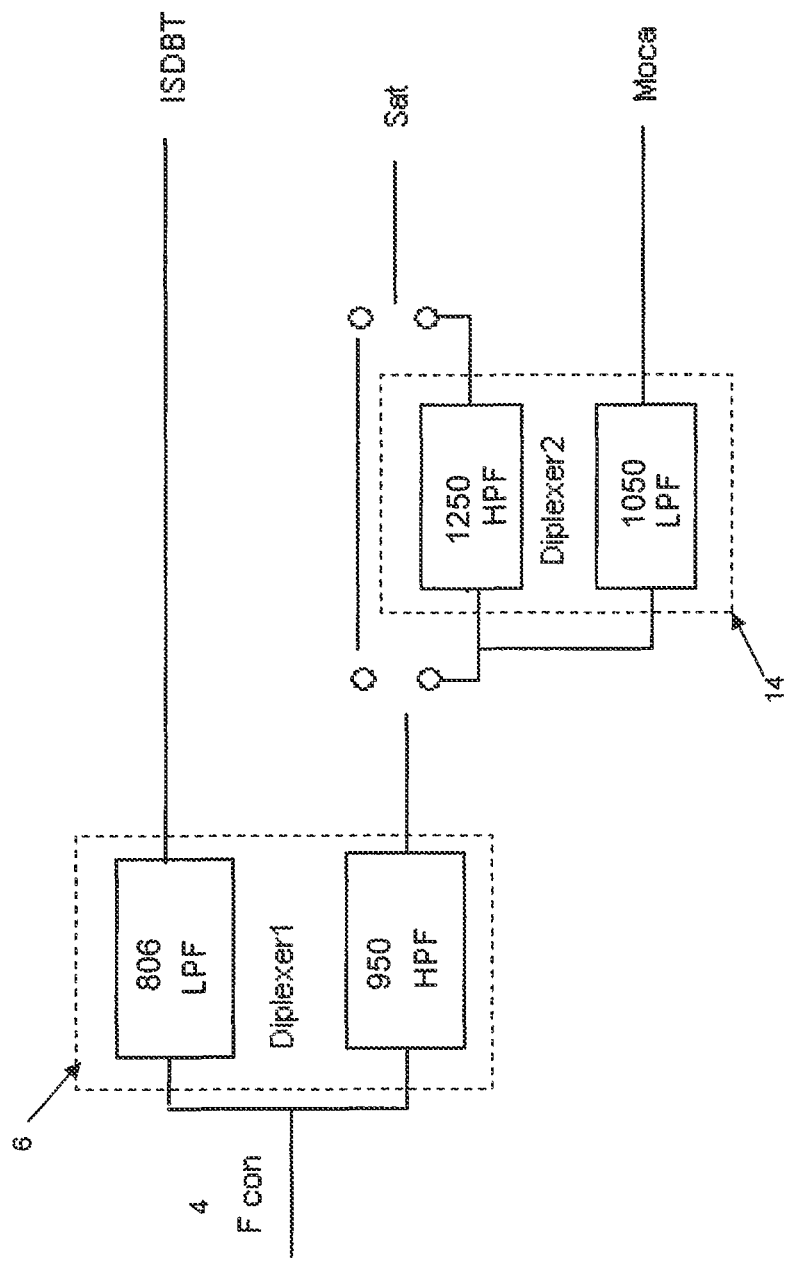
FIG. 2 is a block diagram of diplexers used in the prior art set top box architecture of FIG. 1.
Figure 4:
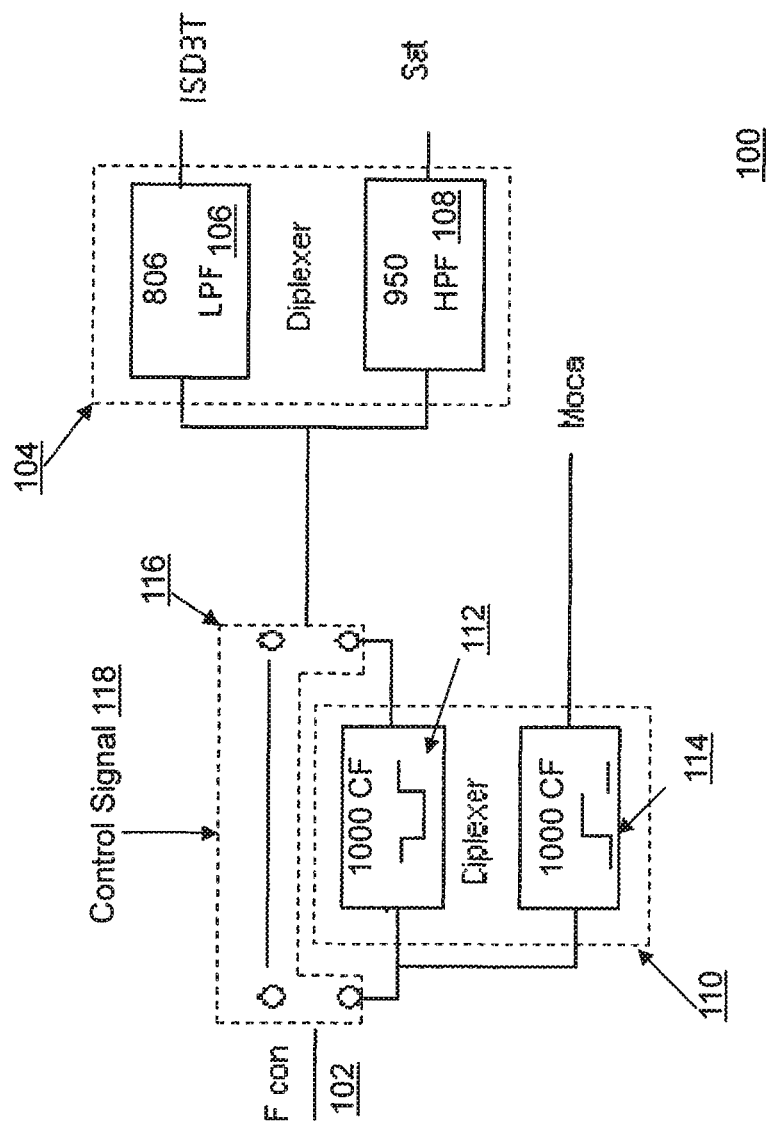
FIG. 4 is a block diagram of a diplexer according to invention principles.

The illustration of the two types of input signals that may be processed by a satellite STB is key to understanding the problem solved by the front end topology according to invention principles. Referring back to the SWM signal in FIG. 3B, there is a certain frequency space between the MoCA Band and the Satellite Band that is unused and is termed the transient band. In order to filter these sub-bands from the full spectrum signal, various filters need to attenuate portions of the signal that are not used for a particular application. Sufficient attenuation requires that the transient band between desirable sub-bands be of sufficient length to allow the filter to operate as intended. In previous iterations such as those discussed in FIGS. 1 and 2, a cascade of diplexers including combinations of low pass filters and high pass filters each having appropriate center frequencies have been used. However, the frequency ranges for these filters do not provide an acceptable level of return loss because, in order for the MoCA sub-band to pass, there should be substantially 50 dB rejection within the 100 MHz and 200 MHz band at substantially 1.1 GHz portion of the full spectrum input signal. To remedy this, the front end according to invention principles modifies the topology of the STB to position a first diplexer formed from a band-stop filter and band pass filter between the F-connector and a second diplexer. The second diplexer includes a high pass filter having a predetermined center frequency and a low pass filter having a predetermined center frequency lower than the center frequency of the high pass filter. The inventive topology which improves the selectivity and return loss is illustrated in FIG. 4. The apparatus further includes a switch that is positioned between the F-connector and each of the first and second diplexers. Thus, in response to detecting the type of signal, the switch is selectively controlled to connect the F-connector with either the first diplexer, the output of which is fed as an input to the second diplexer, or just the second diplexers which filters the original input signal.

The apparatus 100 including the front end topology that improves selectivity during processing of a full spectrum SWM signal is shown in FIG. 4. The components shown in FIG. 4 includes an abbreviated number of components that are typically contained within a STB for processing satellite signals and is used for purposes of clarity to illustrate the principles of the present invention. A more detailed depiction of a STB according to invention principles will be described hereinafter with respect to FIG. 6.

An input signal is received via an F-connector 102. The input signal received may be a first type of input signal or a second type of input signal. The apparatus 100 is preconfigured to know whether the input signal is of the first type or the second type. The first type of input signal includes at least two different sub-bands each containing different type of data whereas the second type of input signal includes at least three different sub-bands each containing data. A first sub-band in each of the first and second type of signals includes the same type of data contained therein. Similarly, a second sub-band of the first type of input signal and a third sub-band of the second type of input signal also contain the same type of data. However, the data contained in the second sub-band of the second type of input signal is not present in the first type of input signal. In one embodiment, the first type of input signal is a legacy signal similar to the one illustrated in FIG. 3A while the second type of input signal is a SWM signal similar to the one illustrated in FIG. 3B.

The apparatus 100 includes a first diplexer 110. The first diplexer 110 includes a band stop (BS) filter 112 that attenuates a predetermined portion of the signal while passing the remaining portions of the signal without any attenuation. The output of the band stop filter 112 is a first filtered signal. The first diplexer 110 also includes a band pass (BP) filter 114 passes a portion of the signal within a predetermined frequency range therethrough while attenuating the remaining portions outside of the passband. The output of the band pass filter 114 is a second filtered signal. Each of the BS filter 112 and BP filter 114 have substantially the same center frequencies which advantageously provides sufficient rejection of a predetermined sub-band while allowing other sub-bands to pass therethrough via the BS filter 112 while simultaneously allowing for the rejected band to be the passband of the BP filter 114. In one embodiment, the BS filter 112 and BP filter 114 have respective center frequencies of substantially 1 GHz thereby reducing the spectrum needed to provide the predetermined rejection of the portion of the input signal in one transmission pathway while maintaining the rejected portion for use in a second different transmission pathway. For example, the BS filter 112 generates the first filtered signal by rejecting the portion of the signal corresponding to the second sub-band in the second type of input signal and provides the portions of the signal having lower frequencies and higher frequencies for further processing. Simultaneously, the BP filter 114 generates the second filtered signal by attenuating the portions of the second type of input signal that have frequencies below and above the frequency of the second sub-band.

The apparatus 100 further includes a second diplexer 104 that includes a low pass filter (LPF) 106 enabling a portion of the signal below a predetermined cut off frequency to pass therethrough thereby generating a third filtered signal. The second diplexer 104 further includes a high pass filter (HPF) 108 enabling a portion of the signal above a different, higher predetermined cut off frequency to pass therethrough thereby generating a fourth filtered signal. In one embodiment, the cut off frequency for the LPF 106 is 806 MHz thereby enabling data in the first sub-band (e.g. the ISDBT sub-band) of either the first type of input signal or second type of input signal to pass therethrough. In this embodiment, the cut off frequency of the HPF 108 is 950 MHz thereby enabling data in the second sub-band of the first type of input signal and data in the third sub-band of the second type of input signal to pass therethrough. In all other instances, the LPF 106 and HPF 108 attenuates the remaining portions of the signal.

A switch 116 selectively connects the F-connector 102 with either the first diplexer 110 or the second diplexer 104 depending on the type of input signal that is received at the F-connector. A control signal 118 provided from a system controller (shown and discussed in FIG. 6) identifies the type of signal being received. In the first mode of operation, the apparatus is configured to receive the second type of input signal at the F-connector 102. In the first operational mode, the switch 116 is configured to connect the F-connector 102 with the first diplexer 110 and also connect an output of the BS filter 112 of the first diplexer 110 with the second diplexer 104. This configuration advantageously enables the BS filter 112 to attenuate the portion of the second type of input signal corresponding to the second sub-band (e.g. MoCA data) thereby generating the second filtered signal while generating and providing the first filtered signal including the portion of the input signal having both higher frequencies and lower frequencies to the second diplexer 104. The second diplexer 104 then receives the first filtered signal which represents a modified second type of input signal including sub-bands below and above the rejected band thereby enabling the LPF 106 and HPF 108 to filter their respective sub-bands to generate the third and fourth filtered signals, respectively. More specifically, the LPF 106 attenuates the portion of the second type of input signal above the cut off frequency of the LPF 106 and outputs the first sub-band representing the ISDBT formatted television data. Simultaneously, the HPF 108 of the first diplexer 104 attenuates the portion of the second type of signal below the cut off frequency of the HPF 108 and outputs the third sub-band representing the satellite data.

Additionally, the inclusion of the BP filter 114 advantageously defines a passband that corresponds substantially to the frequency range of the second sub-band (e.g. MoCA data) and attenuates all other frequencies. Thus, the output of the BP filter 114 represents the second sub-band of the second type of input signal corresponding to MoCA data.

The control signal 118 may alternatively indicate that the apparatus 100 is to operate in a second mode of operation. In this mode, the apparatus may be configured to receive the first type of signal at the F-connector 102. In response to the control signal 118 indicating that the apparatus is operating in the second mode, the switch 116 connects the F-connector 102 with the second diplexer 104. Upon connection thereof, the LPF 106 of the second diplexer 104 attenuates the portion of the first type of input signal above the cut off frequency of the LPF 106 and outputs the first sub-band (e.g. third filtered signal) representing the ISDBT formatted television data. Simultaneously, the HPF 108 of the second diplexer 104 attenuates the portion of the first type of signal below the cut off frequency of the HPF 108 and outputs the second sub-band (e.g. fourth filtered signal) representing the satellite data.

Figure 7A:
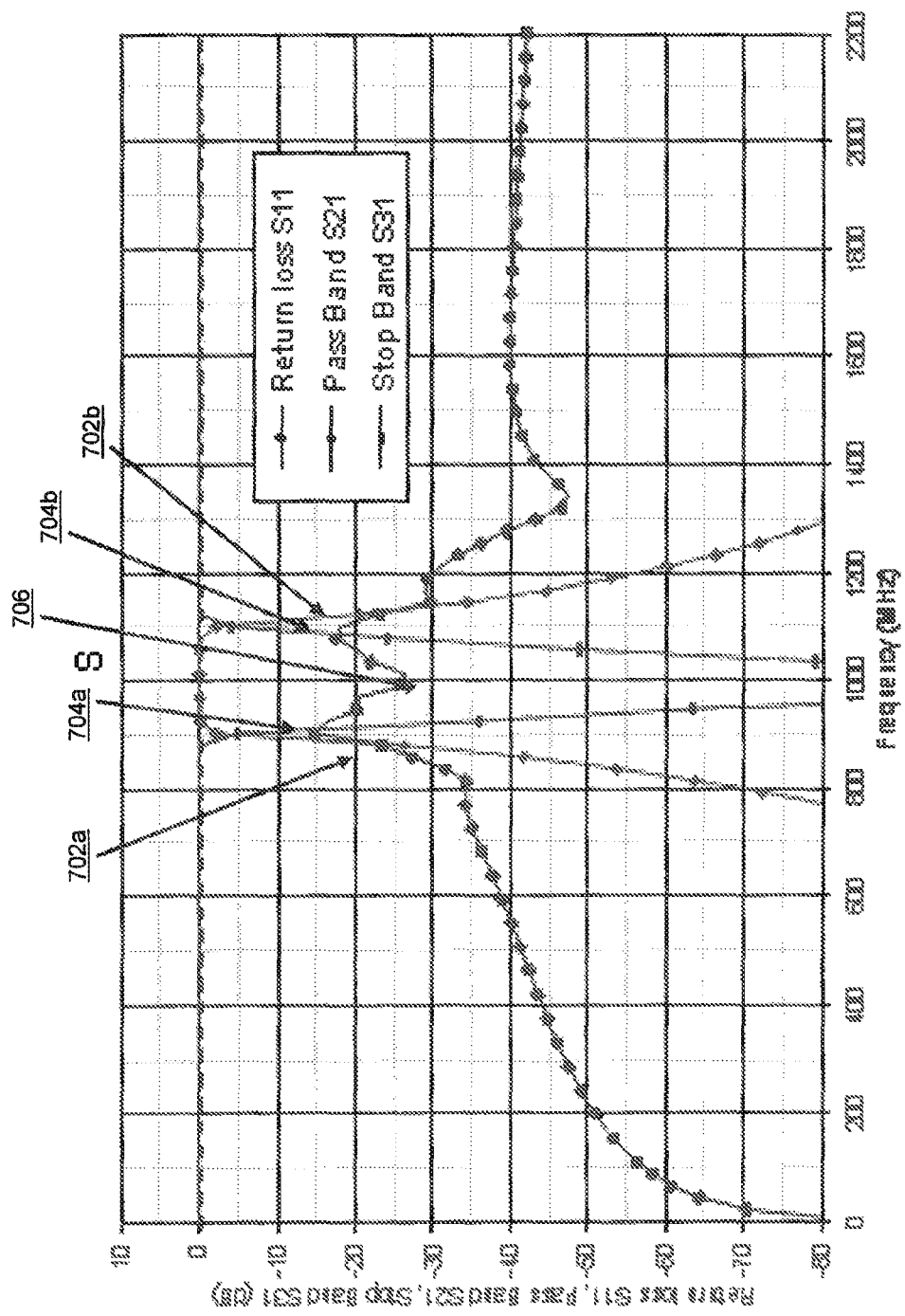
FIGS. 7A-7D are graphical depictions of the filtering characteristics provided by the diplexer according to invention principles.
Figure 7B:
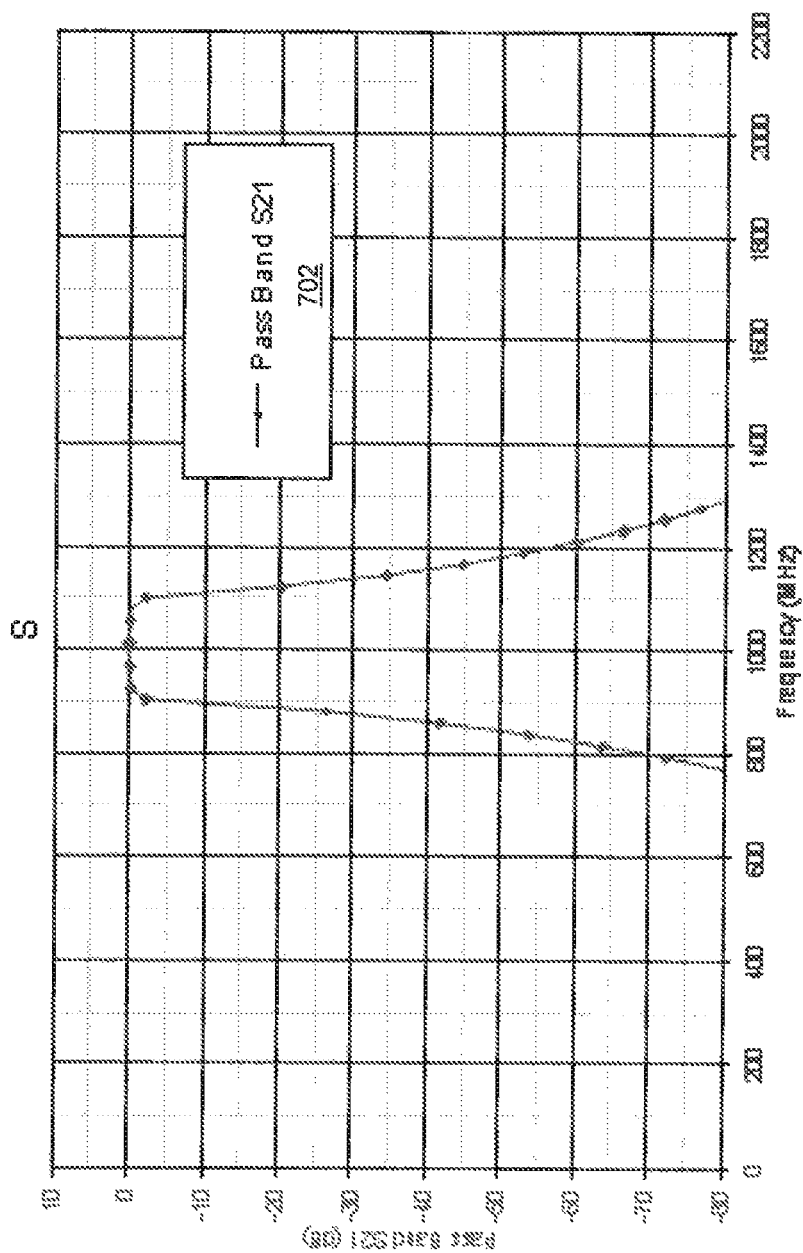
Figure 7C:
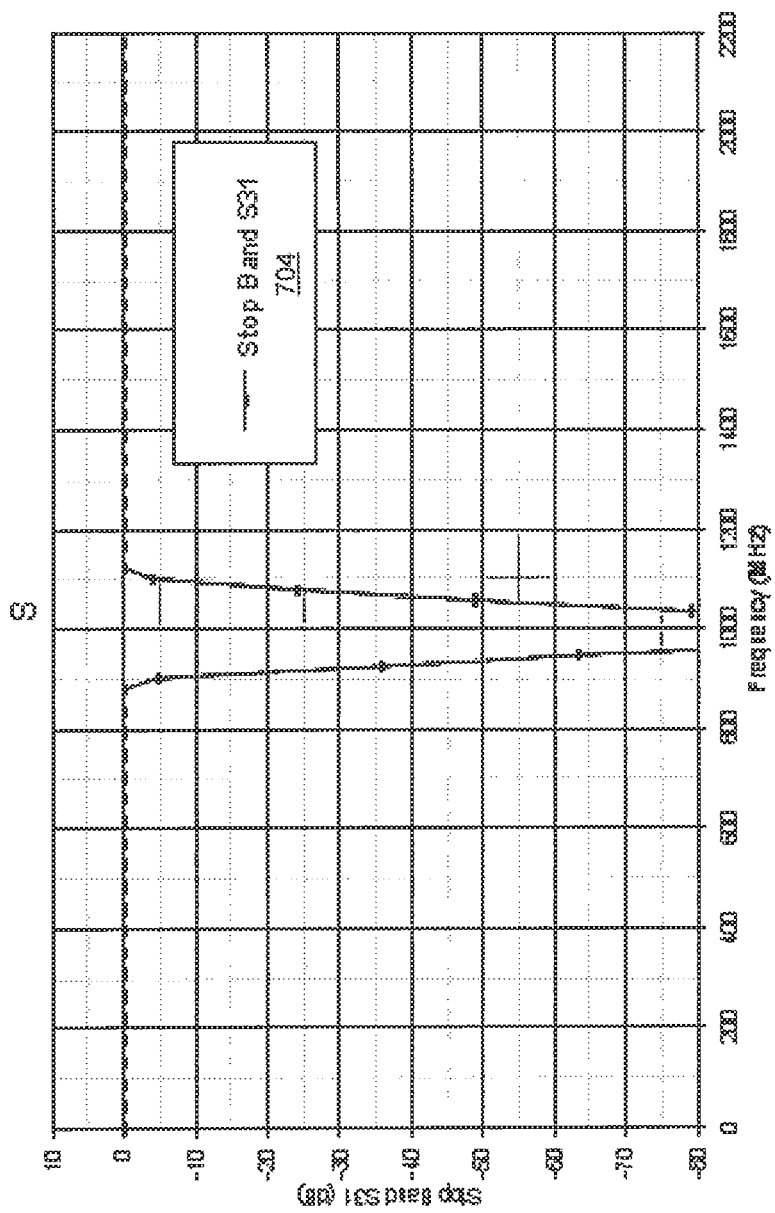
Figure 7D:
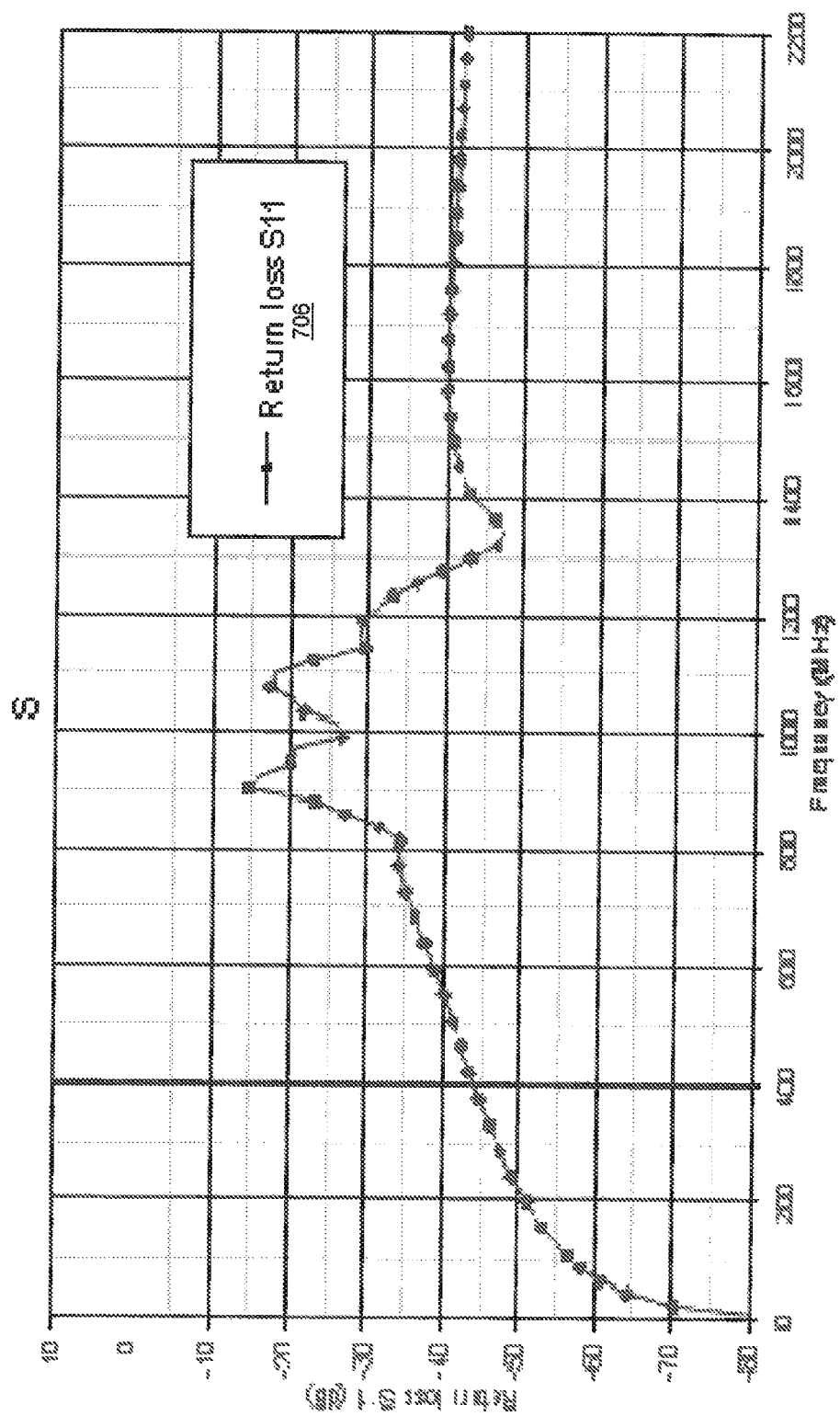

The topology described in FIG. 4 advantageously has an acceptable level of return loss at the F-connector 102 as shown in FIG. 7D, and the selectivity can well meet the design requirement as shown in FIG. 7B and FIG. 7C, the BS filter 112 provides substantially 60 dB of rejection within 70 MHz of the input signal around 1.1 Ghz.

Figure 5:
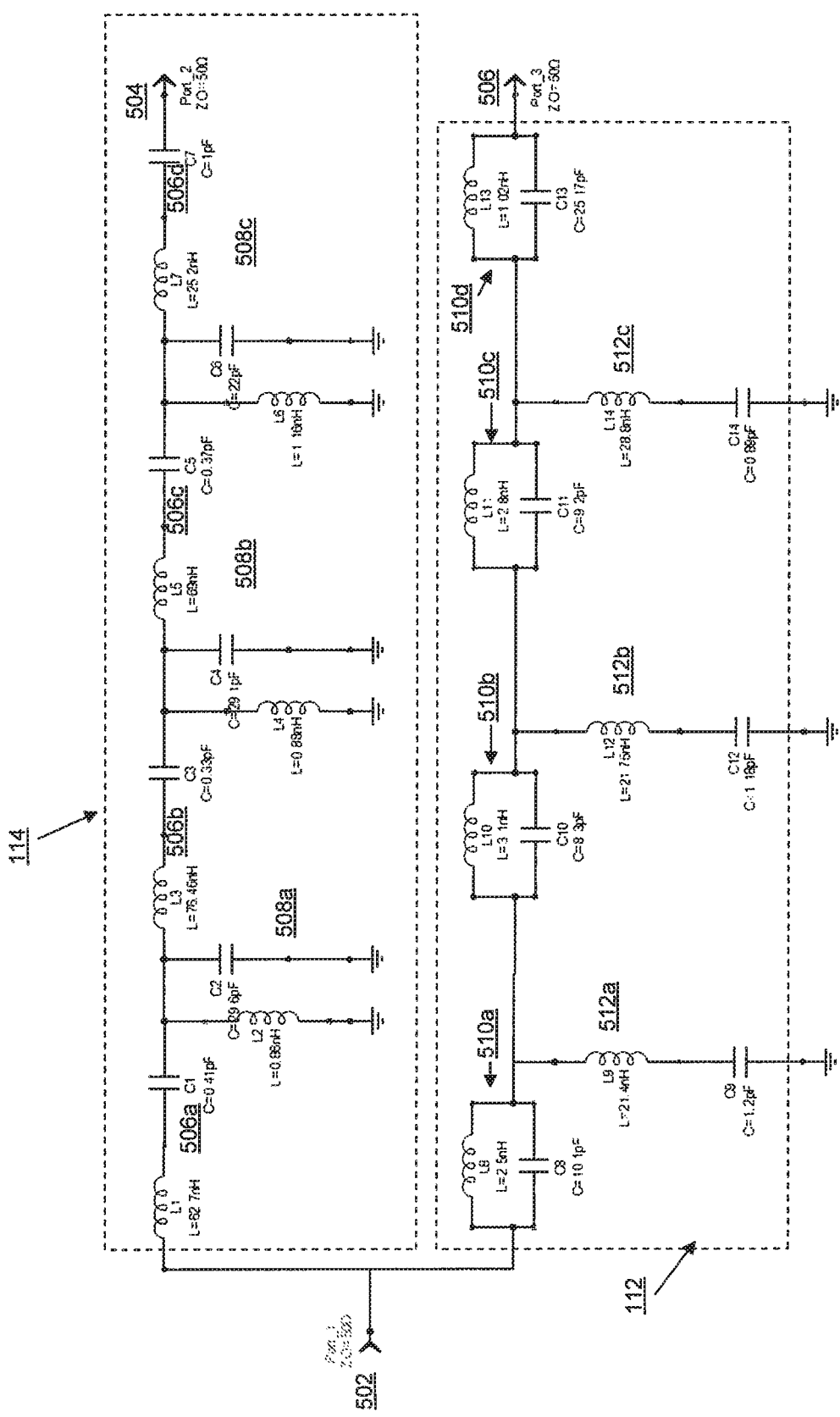
FIG. 5 is a circuit diagram of the diplexer according to invention principles.

An exemplary circuit diagram of the first diplexer 110 of FIG. 4 is shown in FIG. 5. The first diplexer 110 includes the band stop filter 112 and the band pass filter 114. The band pass filter 114 includes a plurality of sets of series resonant circuit 506a-506d formed from an inductor and capacitor being placed in series and sets of parallel resonant circuit 508a-508c formed from an inductor and a capacitor being placed in parallel. Each of series resonant circuit 506a-506c is followed by respective parallel resonant circuit 508a-508c. The last series resonant filter 506d is connected to an output 504.

The band stop filter 112 of the first diplexer 110 includes a plurality of sets of parallel resonant filters 510a-510d formed from inductors and capacitors being placed in parallel and sets of series resonant filters 512a-512c formed from inductors and capacitors being placed in series. Each parallel resonant filter 510a-510c is followed by a respective series resonant filter 512a-512c. The output of parallel resonant filter 510d is connected to an output 506.

As shown in FIG. 5, the diplexer is a $7^{th}$ order diplexer. However, this is described for purposes of example only and the diplexer may be of any order and persons skilled in the art would understand how to design the components of the series and parallel resonant filters to effectively generate a band stop filter that rejects one sub-band of an input signal and a band pass filter that allows only the rejected sub-band to pass therethrough.

Figure 6:
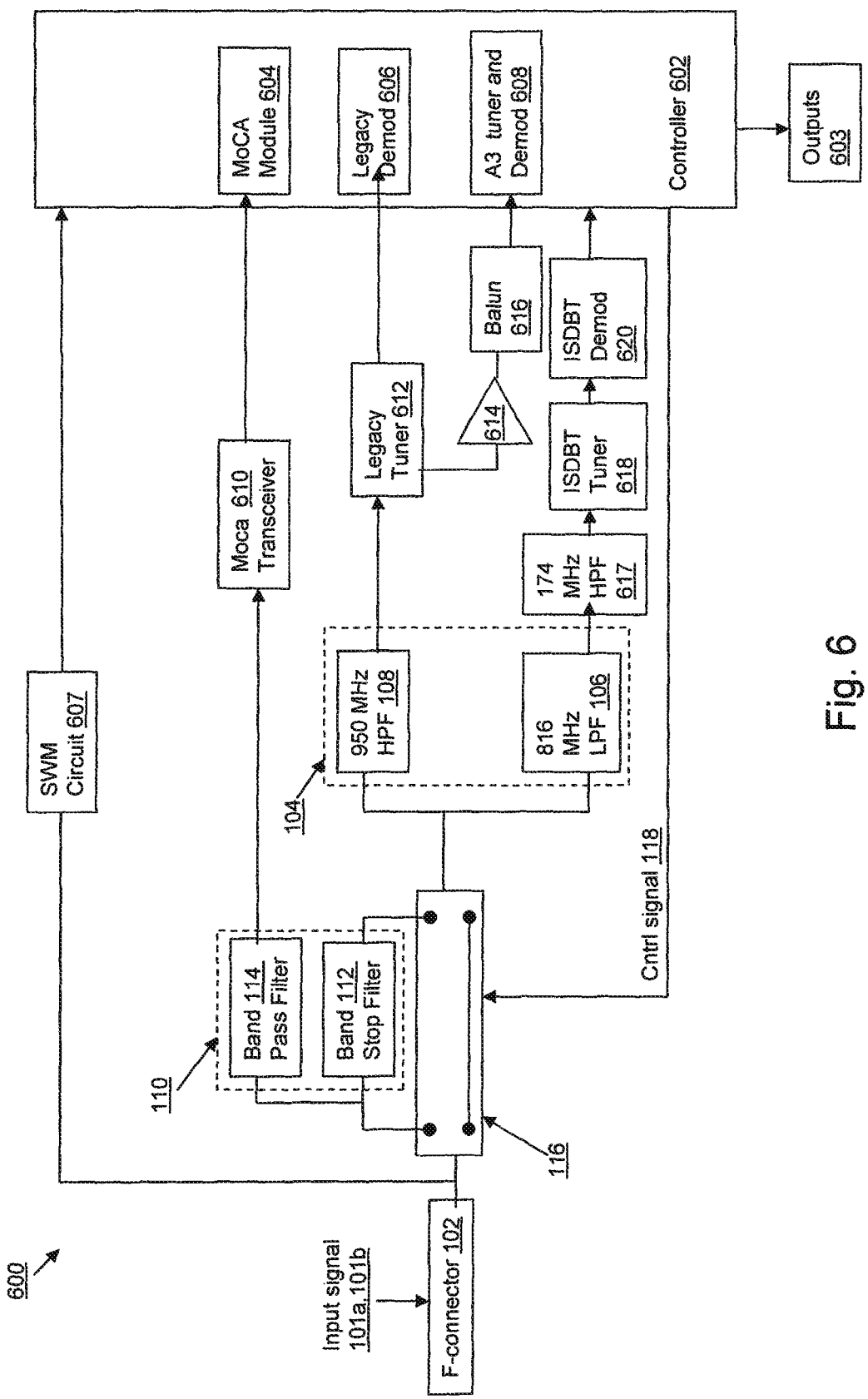
FIG. 6 is a block diagram of a STB including the diplexer according to invention principles.

An exemplary STB 600 including the front end according to invention principles is depicted in FIG. 6. The STB 600 includes a controller 602 for executing instructions for controlling the operation thereof. The controller 602 includes a MoCA module 604 for processing and routing all MoCA related data. The controller also includes legacy demod 606 and A3 tuner and demod 608 for processing tuned digital television data that is received by the STB 600. The STB 600 also includes an F-connector 102 for selectively receiving one of a first type of input signal 101a or a second type of input signal 101b. While the controller 602 of the STB 600 is able to execute instructions for processing both the first type of input signal or the second type of input signal, the controller 602 is pre-configured to process one of the first or second types of input signals. This configuration is generally performed when the satellite receiver is installed and the STB 600 is provided at the user's location. The STB 600 also includes a SWM circuit 607 which is a 2.3 MHz FSK transceiver. The SWM circuit 607 sends commands to an outdoor SWM unit in order to move the satellite transponder to a SWM channel, Additionally, the SWM circuit 607 may also receive the status/response of outdoor unit and provide that information to the controller 602.

The STB 600 also includes a MoCA transceiver 610, a legacy tuner 612 and an ISDBT tuner 618. The MoCA transceiver 610 processes MoCA signals which make up a particular sub-band of the second type of input signal 101b. In particular, the MoCA sub-band is defined by the frequency range of 950 MHz through 1050 MHz. The MoCA signal enables transmission and reception of MoCA data between the STB 600 and other STB's connected thereto via a home network (e.g. coax cable wired in a house). The MoCA data processed by the MoCA transceiver 610 is further provided to the MoCA module 604 of the controller 602. The MoCA module 604 includes all algorithms for complying with the MoCA standard and further directs processing of the MoCA data.

The legacy tuner 612 processes satellite data (e.g. networking data) that forms either the second sub-band of the first type of input signal 101a having a frequency range of 950 MHz and 2150 MHz or the third sub-band of the second type of input signal 101b which has a frequency range of 1250 MHz and 2150 MHz. The legacy tuner 612 has a loop through amplifier that splits the RF input signal to the A3 tuner and demod 608 via an amplifier 614 and balun 616.

The legacy demod 606 and the A3 tuner and demod 608 selectively provide decoded satellite data to a respective output 603 for display or other processing. The legacy demod 606 decodes the satellite network information, such as frequency, FEC rate, symbol rate for each satellite TV channel, and the A3 tuner and demod 608 decodes the satellite TV channel data and send the data stream to a video decoder for processing and output to a view. The output 603 may include any type of audio-visual output port including HDMI, component and/or composite video ports. The output may also include an Ethernet port for outputting networking data. These types of outputs are described for purposes of example only and any type of output may be included within STB 600.

The ISDBT tuner 618 selectively tunes data contained in the first sub-band of either the first input signal 101*a* or second input signal 101*b*. The first sub-band has a frequency range between 174 MHz to 806 MHz and contains ISDBT formatted digital television data. The ISDBT tuner 618 receives an input signal in this frequency range and tunes to the particular frequency selected by the user. The tuned signal is demodulated by an ISDBT demodulator 620 and provided to a respective output 603 by the controller 602. Upstream from ISDBT tuner 618 is a high pass filter 617 having a cutoff frequency of substantially 174 Mhz. The high pass filter 617 removes FM band, SWM tone or DisEqC tone. In legacy mode, a 22 kHz DisEqC signal is used to send commands to outdoor unit, such as LNB, or outdoor antenna switch. In SWM mode, the 2.3 MHz FSK signal is used to communicate with the outdoor SWM module, to assign a SWM channel to a satellite transponder coming from the satellite antenna and this signal is processed by SWM circuit 607 discussed above.

The STB 600 includes a first diplexer 110. The first diplexer 110 includes a band stop filter 112 for attenuating the input signal 101 to remove data within a predetermined frequency band while passing data of the input signal at all other frequencies on for further processing. The first diplexer 110 includes a band pass filter 114 that attenuates the input signal at all frequencies outside of the desired passband. Thus, the band pass filter 114 selects a particular sub-band from the input signal to be output for further processing. The STB 600 further includes a second diplexer 104. The second diplexer 104 includes the low pass filter 106 for attenuating an input signal above a predetermined cut off frequency and a high pass filter 108 for attenuating the input signal below a predetermined cut off frequency thereof. The cut off frequency of the low pass filter is lower than the cut off frequency of the high pass filter.

A switch 116 selectively connects the F-connector 102 with one of the first diplexer 104 in a first operational mode and the second diplexer 110 in a second operational mode. The operational mode of the STB 600 is determined based on the type of input signal being received at the F-connector 102. In the first mode of operation, the STB 600 is configured to receive the second type of input signal as shown in FIG. 3B. The second type of input signal has the additional sub-band including MoCA data. In the second mode of operation, the STB 600 is configured to receive the first type of input signal as shown in FIG. 3A. The first type of input signal is a legacy signal and does not include a sub-band of MoCA data.

The controller 602 issues a control signal 118 for configuring the switch 116 in response to determining that type of mode in which the STB 600 is to operate. In a first mode of operation, the controller 602 determines that the STB is configured to receive the second type of input signal at the F-connector 102. The second type of input signal includes a first sub-band with a frequency range of 174 MHz and 806 MHz corresponding to ISDBT data, a second sub-band with a frequency range of 950 MHz and 1050 MHz corresponding to MoCA data and a third sub-band with a frequency range of 1250 MHz and 2150 MHz corresponding to satellite data. The control signal 118 configures the switch 116 to connect the F-connector 102 with the first diplexer 110 and also connects an output of the band stop filter 112 to the second diplexer 104. The second type of input signal 101*b* is provided to the first diplexer 110 via the switch 116. The band stop filter 112 generates the first filtered signal by attenuating the second type of input signal at the frequency corresponding to the second sub-band (e.g. MoCA data) while allowing the first sub-band and third sub-band to be provided, as the first filtered signal, to the second diplexer 104 for further filtering as discussed below.

The second input signal 101*b* is further filtered by the band pass filter 114 which generates the second filtered signal by attenuating the second type of input signal 101*b* at frequencies outside those defined by the passband of between 950 MHz. and 1050 MHz. Thus, the signal output by the band pass filter 114 corresponds to the second sub-band containing the MoCA related data which is provided to the MoCA transceiver 610 for further processing as is known in the art.

The second diplexer 104 receives, as an input, the first filtered signal which is filtered by the low pass filter 106 to generate the third filtered signal and the high pass filter 108 to generate the fourth filtered signal. The low pass filter 106 attenuates the input signal at frequencies greater than 806 MHz and outputs a signal comprising substantially the first sub-band to the ISDBT tuner 618. The ISDBT tuner 618 tunes the signal accordingly and the tuned signal is demodulated by the ISDBT demodulator 620 prior to output by the controller 602. Additionally, the first type of input signal 101*a* is filtered by the high pass filter 108 which attenuates the first type of input signal at frequencies less than 950 MHz and outputs a signal comprising substantially to the second sub-band to the legacy tuner 612 prior to being output by the controller 602.

If the controller 602 determines that the STB should operate in the second mode, the control signal 118 configures the switch 116 to connect the F-connector 102 within the second diplexer 104. In operation, the first type of input signal 101*a* having a first sub-band with a frequency range of 174 MHz and 806 MHz corresponding to ISDBT data and a second sub-band with a frequency range of 950 MHz and 2150 MHz corresponding to satellite data is received at the F-connector 102. Because the switch 116 is configured to connect the F-connector 102 with the second diplexer 104, the first type of input signal 101*a* is filtered by the low pass filter 106 to generate the third filtered signal and the high pass filter 108 to generate the fourth filtered signal. The low pass filter 106 attenuates the input signal at frequencies greater than 806 MHz and outputs a signal comprising substantially the first sub-band to the ISDBT tuner 618. The ISDBT tuner 618 tunes the signal accordingly and the tuned signal is demodulated by the ISDBT demodulator 620 prior to output by the controller 602. Additionally, the first type of input signal 101*a* is filtered by the high pass filter 108 which attenuates the first type of input signal at frequencies less than 950 MHz and outputs a signal comprising substantially to the second sub-band to the legacy tuner 612 prior to being output by the controller 602.

The topology of the STB 600 in FIG. 6 advantageously improves return loss at the F-connector 102 and the BS filter 112 provides substantially 60 dB of rejection within 70 MHz of the input signal around 1.1 Ghz.

FIGS. 7A-7D provide graphical depictions of the frequency responses of the first diplexer 110 in FIGS. 4-6. These graphs also provides a visual representation of the improved return loss and selectivity when the STB 600 is operating in the first mode and uses the first diplexer 110 to provide MoCA rejection prior to filtering by the second diplexer 104. Lines labeled 702 represent the passband frequency characteristic, which can be seen clearly in FIG. 7B, whereas lines labeled 704 represent the bandstop frequency response, which can be seen clearly in FIG. 7C, and the line labeled 706 represents the return loss at the given frequency band, which can be seen clearly in FIG. 7D. Lines 702a and 704a converge at substantially 950 MHz and thereby set the lower boundary of the band stop and lines 702b and 704b converge at substantially 1050 MHz representing the upper boundary of the band stop. By using this configuration for the first diplexer 110, the apparatus advantageously achieves 60 dB rejection over Moca band 950 MHz to 1050 MHz. From FIG. 7A, we can see the selectivity of moca pass band is steep, the transient from 1050 MHz to 1250 MHz can reach 80 dB. Moreover, the return loss at F-connector can reach a highly desirable level of substantially 35 dB at satellite band which is a challenge for STB design. This is highly desirable because it is conventionally understood that return loss greater than 10 dB represents a good wide band design and most STBs have a return loss design requirement no less than 8 dB. FIG. 7D shows this highly desirable return loss on all sub-bands of the input signal processed by the diplexer of FIGS. 4-6. FIG. 7A is a combination plot that includes the individual plots of FIGS. 7B-7D.

Figure 8:
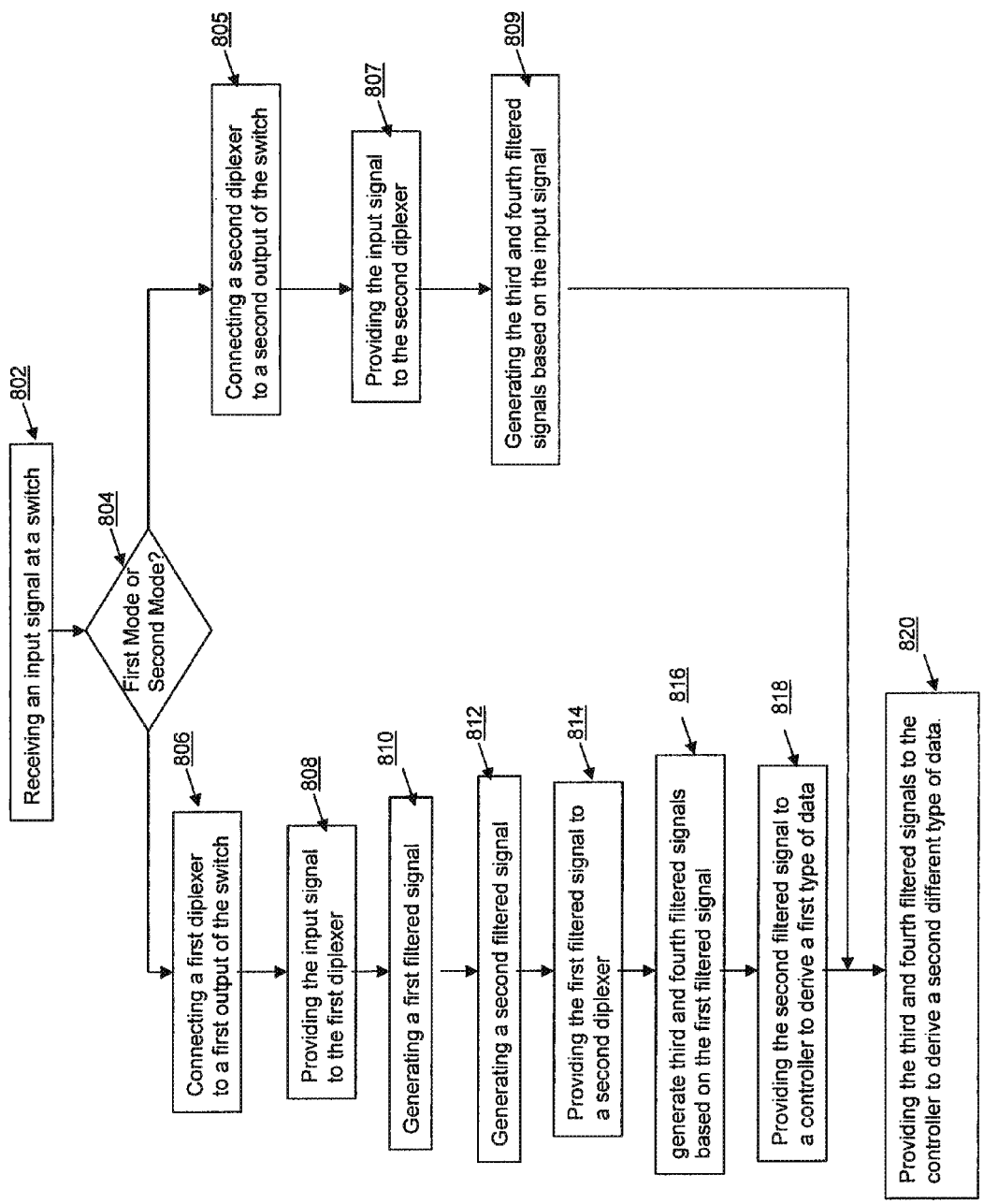
FIG. 8 is a flow diagram detailing the operation of the system according to invention principles.

FIG. 8 is a flow diagram detailing the manner in which satellite signals are processed by the STB 600 according to invention principles. At step 802, an input signal is received at a switch 116. The input signal has a predetermined frequency range, the predetermined frequency range including at least two frequency sub-bands. In step 804, a controller 602 activates the switch 116 to operate between a first mode and a second mode. In response to activating the switch 116 to operate in a first mode, a first diplexer 110 is connected to a first output of the switch 116 in step 806 and the input signal is provided to the first diplexer 110 in step 808. A first filtered signal is generated in step 810. The first filtered signal includes a first frequency sub-band and a second frequency sub-band. A second filtered signal is generated in step 812 and includes a third frequency sub-band. In step 814, the first filtered signal is provided to a second diplexer 104. Based on the first filtered signal, a third filtered signal including the first frequency sub-band and a fourth filtered signal including the second frequency sub-band are generated in step 816. In step 818, the second filtered signal is provided from the first diplexer 110, to the controller 602 to derive a first type of data. In step 820, the third and fourth filtered signals are provided to the controller 602 to derive a second different type of data.

Returning back to step 804, in response to activating the switch 116 to operate in a second mode, a second output of the switch 116 to the second diplexer 104 is connected in step 805. The input signal is provided to the second diplexer 104 in step 807. A third filtered signal including the first frequency sub-band and a fourth filtered signal including the second frequency sub-band are generated using the input signal in step 809. Once the third and fourth filtered signals are generated in the second mode of operation, the process continues at step 820 whereby the third and fourth filtered signals are provided to the controller 602 to derive a second different type of data.

Implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, tablets, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An apparatus for processing satellite signals comprising:
   a switch that receives an input signal having a predetermined frequency range, said predetermined frequency range including at least two frequency sub-bands;
   a first diplexer, connected to a first output of said switch, that generates a first filtered signal including a first frequency sub-band and a second frequency sub-band and a second filtered signal including a third frequency sub-band;
   a second diplexer, connected to a second output of said switch, that generates a third filtered signal including said first frequency sub-band and a fourth filtered signal including said second frequency sub-band; and a controller that activates said switch to operate between a first mode and a second mode,
  in said first mode, said switch providing said input signal to said first diplexer to generate said first and second filtered signals, said first diplexer providing said first filtered signal to said second diplexer to generate said third and fourth filtered signals from said first filtered signal, said second filtered signal being provided to said controller to derive a first type of data therefrom and said third and fourth filtered signals being provided to said controller to derive a second different type of data therefrom,
  in said second mode, said switch providing said input signal to said second diplexer to generate said third and fourth filtered signals from said input signal, said second diplexer providing said third and fourth filtered signals to said controller to derive said second different type of data therefrom.

2. The apparatus as recited in claim 1, wherein said first diplexer includes a band stop filter and a band pass filter, wherein a passband of said band pass filter is equal to a band rejected by said band stop filter.

3. The apparatus as recited in claim 1, wherein said second diplexer includes a high pass filter and a low pass filter, wherein a cut-off frequency of said low pass filter is less than a cut-off frequency of said high pass filter.

4. The apparatus as recited in claim 1, wherein said input signal includes one of a legacy satellite signal and a single wire-multiswitch mode (SWM) signal.

5. The apparatus as recited in claim 4, wherein said legacy satellite signal includes a first sub-band having ISDBT data and a second sub-band having satellite data, said second sub-band having a frequency range higher than said first sub-band.

6. The apparatus in claim 4, wherein said SWM mode signal includes a first sub-band having ISDBT data and a second sub-band having MoCA data and a third sub-band having satellite data, said second sub-band having a frequency range between a frequency range of said first sub-band and a frequency range of said third sub-band.

7. A method of processing satellite signals comprising:
  receiving, at a switch, an input signal having a predetermined frequency range, said predetermined frequency range including at least two frequency sub-bands;
  activating said switch by a controller to operate between a first mode and a second mode,
    in response to activating said switch to operate in a first mode,
      connecting a first diplexer to a first output of said switch;
      providing said input signal to said first diplexer;
      generating a first filtered signal including a first frequency sub-band and a second frequency sub-band and a second filtered signal including a third frequency sub-band;
      providing said first filtered signal to a second diplexer;
      generating, based on said first filtered signal, a third filtered signal including said first frequency sub-band and a fourth filtered signal including said second frequency sub-band;
    in response to activating said switch to operate in a second mode,
      connecting a second output of said switch to said second diplexer;
      providing said input signal to said second diplexer;
      generating based on said input signal, said third filtered signal including said first frequency sub-band and a fourth filtered signal including said second frequency sub-band;
      providing, from said first diplexer, said second filtered signal to said controller to derive a first type of data; and
      providing, from said second diplexer, said third and fourth filtered signals to said controller to derive a second different type of data.

8. The method as recited in claim 7, wherein said activity of generating in said first mode includes
  using a band pass filter to generate said first filtered signal; and
  using a band stop filter to generate said second filtered signal, wherein a passband of said band pass filter is equal to a frequency band rejected by said band stop filter.

9. The method as recited in claim 7, wherein said activity of generating in said second mode includes
  using a low pass filter to generate said third filtered signal; and
  using a high pass filter to generate said fourth filtered signal, wherein a cut-off frequency of said low pass filter is less than a cut-off frequency of said high pass filter.

10. The method as recited in claim 7, wherein said input signal includes one of a legacy satellite signal and a single wire-multiswitch mode (SWM) signal.

11. The method as recited in claim 10, wherein said legacy satellite signal includes a first sub-band having ISDBT data and a second sub-band having satellite data, said second sub-band having a frequency range higher than said first sub-band.

12. The method as recited in claim 10, wherein said SWM mode signal includes a first sub-band having ISDBT data and a second sub-band having MoCA data and a third sub-band having satellite data, said second sub-band having a frequency range between a frequency range of said first sub-band and a frequency range of said third sub-band.

13. An apparatus for processing satellite signals comprising:
  means for receiving an input signal having a predetermined frequency range, said predetermined frequency range including at least two frequency sub-bands;
  a first means for filtering, connected to a first output of said means for receiving, for generating a first filtered signal including a first frequency sub-band and a second frequency sub-band and a second filtered signal including a third frequency sub-band;
  a second means for filtering, connected to a second output of said means for receiving, for generating a third filtered signal including said first frequency sub-band and a fourth filtered signal including said second frequency sub-band; and
  means for activating said means for receiving to operate between a first mode and a second mode,
    in said first mode, said means for receiving provides said input signal to said first means for filtering to generate said first and second filtered signals, said first means for filtering provides said first filtered signal to said second means for filtering to generate said third and fourth filtered signals from said first filtered signal, in said second mode, said means for receiving provides said input signal to said second filtering means to generate said third and fourth filtered signals from said input signal; and means for processing filtered signals, that
in said first mode, receives said second filtered signal to derive a first type of data therefrom and receives said third and fourth filtered signals to derive a second different type of data therefrom, and
in said second mode, receives said third and fourth input signal generated based on said input signal to derive said second different type of data therefrom.

14. The apparatus as recited in claim 13, wherein
said first filtering means has a first diplexer including a band stop filter and a band pass filter, wherein a passband of said band pass filter is equal to a band rejected by said band stop filter.

15. The apparatus as recited in claim 14, wherein
said second filtering means has second diplexer including a high pass filter and a low pass filter, wherein a cut-off frequency of said low pass filter is less than a cut-off frequency of said high pass filter.

16. The apparatus as recited in claim 13, wherein
said input signal includes one of a legacy satellite signal and a single wire-multiswitch mode (SWM) signal.

17. The apparatus as recited in claim 16, wherein
said legacy satellite signal includes a first sub-band having ISDBT data and a second sub-band having satellite data, said second sub-band having a frequency range higher than said first sub-band.

18. The apparatus in claim 16, wherein
said SWM mode signal includes a first sub-band having ISDBT data and a second sub-band having MoCA data and a third sub-band having satellite data, said second sub-band having a frequency range higher between a frequency range of said first sub-band and a frequency range of said third sub-band.

* * * * *